United States Patent [19]
Ochs et al.

[11] Patent Number: 5,541,571
[45] Date of Patent: Jul. 30, 1996

[54] HAND-HELD TRANSMITTER FOR THE REMOTE CONTROL OF VARIOUS VEHICLE SYSTEMS

[75] Inventors: Siegfried Ochs, Remshalden; Peter Brenner, Wernau, both of Germany

[73] Assignee: Mercedes-Benz AG, Germany

[21] Appl. No.: 378,718

[22] Filed: Jan. 26, 1995

[30] Foreign Application Priority Data

Jan. 31, 1994 [DE] Germany .................. 44 02 853.9

[51] Int. Cl.⁶ .................................... B60R 25/10
[52] U.S. Cl. .............. 340/426; 340/438; 340/825.31; 340/825.5; 70/237; 70/256; 70/257; 70/336; 307/10.1; 307/10.2; 307/10.3; 367/197; 367/199
[58] Field of Search ............... 340/438, 825.31, 340/825.5; 70/237, 256, 257, 336; 307/10.1, 10.2, 10.3

[56] References Cited

U.S. PATENT DOCUMENTS 4,868,409  9/1989  Tanaka et al. .............. 307/10.5

FOREIGN PATENT DOCUMENTS

| 3314072C2 | 10/1984 | Germany. |
|---|---|---|
| 3842790C1 | 4/1990 | Germany. |
| 4238042 | 5/1994 | Germany. |
| 2240418 | 7/1991 | United Kingdom. |

OTHER PUBLICATIONS

French Search Report dated Jun. 9, 1995.

*Primary Examiner*—Brent A. Swarthout
*Assistant Examiner*—Daryl C. Pope
*Attorney, Agent, or Firm*—Evenson, McKeown, Edwards & Lenahan P.L.L.C.

[57] ABSTRACT

The invention relates to a hand-held transmitter for the remote control of various vehicle systems with integrated normal key. A housing has electronics and the normal key connected to the said housing, and a sensor system which detects positions or movements of the normal key. Here, a code for the remote-controlled actuation of at least the lock system of the vehicle is emitted as a function of the signals of the sensor system.

10 Claims, 2 Drawing Sheets

5,541,571

HAND-HELD TRANSMITTER FOR THE REMOTE CONTROL OF VARIOUS VEHICLE SYSTEMS

BACKGROUND AND SUMMARY OF THE INVENTION

The invention relates to a hand-held transmitter for the remote control of various vehicle systems, which hand-held transmitter has a housing with electronics and an integrated normal key.

Lock systems for the mechanical and electronic control of locking devices in motor vehicles which are actuated by means of an electronic key with an integrated normal key are known. German Patent Document DE-3314072-C2 describes such a lock system together with the associated key which additionally contains a remote-control facility for vehicle systems.

Furthermore, publications are concerned with the advantageous, geometric design of the multi-function keys associated with such lock systems, the keys consisting of the electronic keys of the remote-control system with integrated normal keys. German Patent Document DE-3842790-C1 describes a key structure which only requires a small amount of constructional space for the normal keys in the housing, in which housing further additional functions are integrated.

A disadvantage of these electronic remote control locking systems together with the associated keys lies in the fact that the users tend to forget to lock the vehicle. Since it is not necessary to introduce the normal key into one of the external locks of the vehicle, the user often neglects, in particular when distracted, to actuate the switch of the electronic key for the actuation of the locking, warning and other security measures. Thus, the vehicle is not secured against unauthorized access.

A further disadvantage lies in the fact that, despite the remote control, it is complicated to open and close the vehicle. Several maneuvers are necessary to prepare the closing process including putting away the key and to prepare the opening process including starting the vehicle. Thus, the control key for the remote control has to be actuated and the normal key has to be folded away or opened out.

Therefore, the invention is based on the object of improving a hand-held transmitter of the generic type for the remote control of various vehicle systems with integrated normal key to the extent that the closing or opening process is simplified. At the same time, a safeguard is to be provided that the user can no longer forget to actuate the lock system when he puts away the multi-function key.

The solution according to preferred embodiments of the invention results in the operation of the hand-held transmitter and of the lock system being made substantially more convenient by virtue of the combination of the actuation of the electronic key of the remote control with the process of folding away and opening out the normal key (key bit). In addition, the combination, according to the invention, of the two activities, the putting away of the normal key (key bit) in the key housing and the actuation of the trigger of the remote control prevents unintentional omission to lock and secure the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
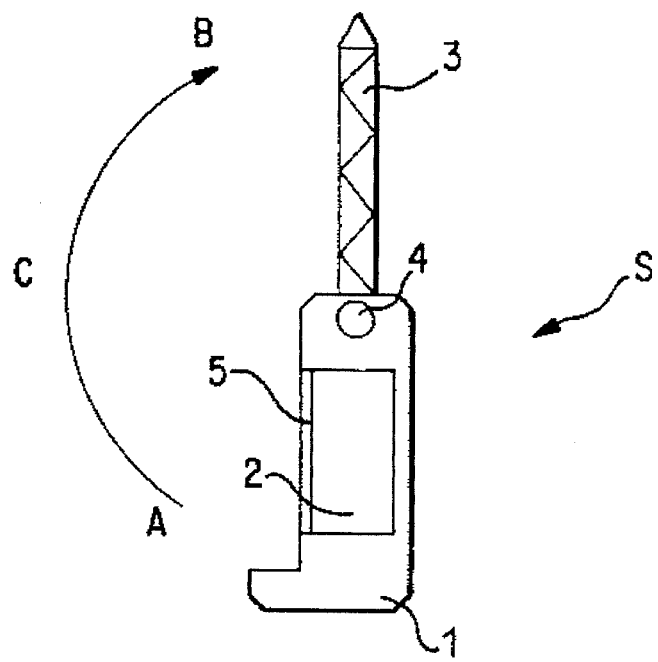
FIG. 1 schematically depicts a hand-held transmitter with opened-out normal key in the position for activating the vehicle—constructed according to a preferred embodiment of the invention.
Figure 2:
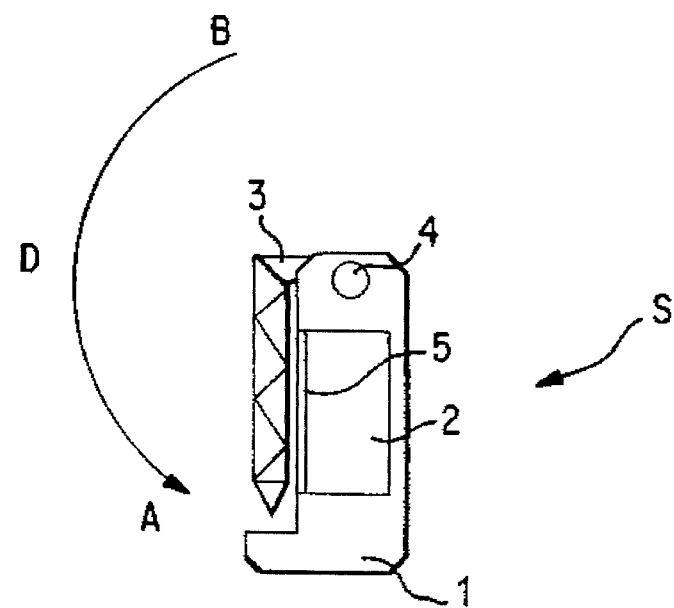
FIG. 2 shows the hand-held transmitter of FIG. 1 with folded-away normal key in the position of rest.

The hand-held transmitter S consists essentially of a housing 1, electronics 2 and a normal key 3 in the form of a key bit. The normal key 3 (key bit) is connected to the housing 1 by means of a folding mechanism 4 or sliding mechanism. FIG. 1 shows the normal key 3 in an engaged key position B for activating the vehicle (driving position). FIG. 2 shows the normal key 3 in an engaged key position A (position of rest) resting against the housing 1.

A sensor system 5 which constitutes part of the electronics detects either the position of the normal key 3 or its movement. If the sensor system 5 detects that the normal key 3 is in the driving position or is passing through the movement C into the driving position B, this is interpreted as a desire for activation. From the hand-held transmitter a code or a signal is emitted which brings about unlocking of the lock system of the vehicle including the ignition lock. If appropriate, further functions for activating the vehicle, e.g., releasing the demobilizer, are initiated.

If, on the other hand, the sensor system 5 detects the normal key 3 is in the position of rest A or is passing through the movement D into the position of rest, this is interpreted as a desire for locking. From the hand-held transmitter a code or signal is emitted which brings about locking of the lock system of the vehicle. If appropriate, further functions for the deactivation of the vehicle, e.g., the activation of the immobilizer, are initiated.

The electronic system has, as a further advantageous development for remote controls which have a transmitting component and a receiving component, an interrogation deice which, during the closing process D or in the position of rest A of the normal key 3, interrogates whether the vehicle is already closed or a closing process has been initiated. If a closing process is initiated at the vehicle, with the normal key 3 or by means of the remote control, a corresponding signal is transmitted by means of the lock system of the vehicle,and the electronics 2 of the hand-held transmitter stores this information. The information is cleared when the vehicle is opened. As described above, a corresponding opening signal is transmitted by the lock system and processed by the electronics 2. If the closing process D or the position of rest A of the normal key 3 is detected by the sensor system 5 of the hand-held transmitter and the result of the interrogation is that the vehicle is either closed or is being locked, a warning signal sounds which informs the user that his vehicle is not protected against unauthorized access. If, on the other hand, the normal key 3 is opened out without being in the transmitting area of the vehicle and if the vehicle has been correctly locked, the warning tone is not emitted when the normal key 3 is folded back into the position of rest A since the memory contains the locking signal.

In some embodiments of the hand-held transmitters, the normal key 3 is held in the position of rest A by means of a locking device. When the locking device is opened, the normal key 3 is moved into the driving position B, e.g. by means of a spring tensioning. In these models it is a preferred embodiment to trigger the signal of the remote control for opening and activating the vehicle with the unlocking of the normal key. The same applies for hand-held transmitters in which the normal key is moved by unlocking into the position of rest A.

Figure 3:
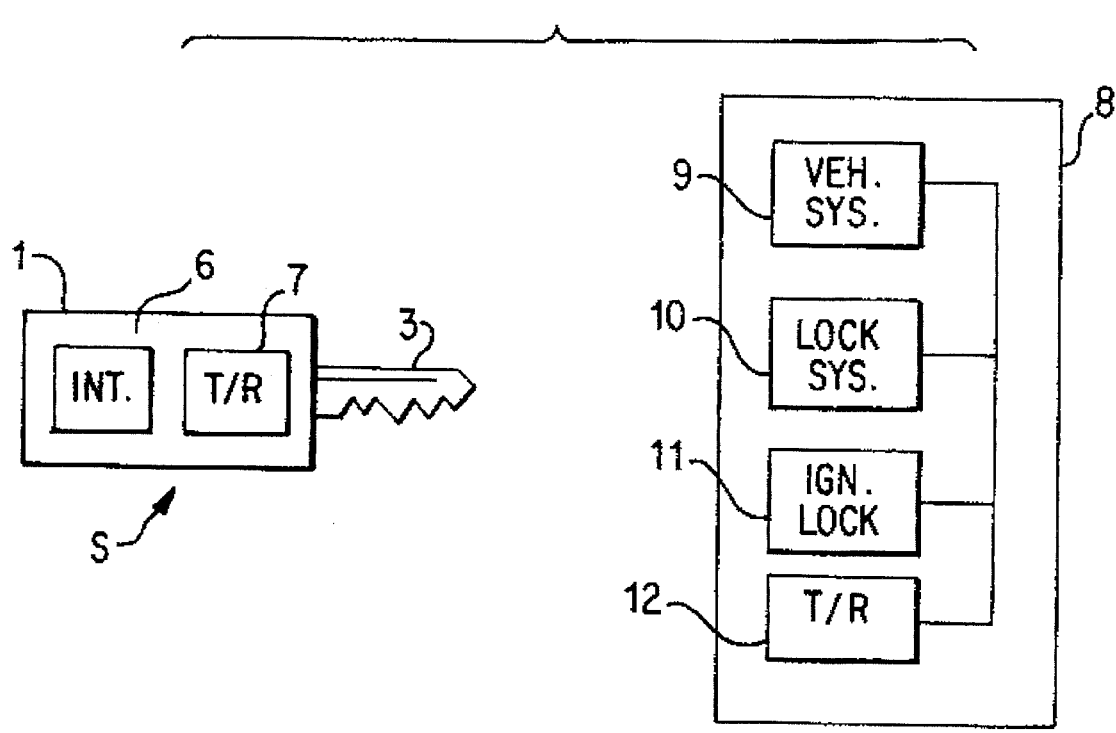
FIG. 3 is a schematic illustration of the transmitter of FIGS. 1 and 2, together with the vehicle systems with which it communicates.

FIG. 3 is a schematic diagram which shows the hand-held transmitter S, as shown in FIGS. 1 and 2, as well as the vehicle 8 and the various systems which may be controlled by signals from the hand-held transmitter unit. These include the vehicle lock system 10, the ignition lock 11, as well as various other vehicle systems 9. As also shown in FIG. 3, the hand-held unit S includes the interrogation device 6, mentioned previously, as well as the transmitter/receiver 7 which communicates with the transmitter/receiver 12 located on the vehicle.

Other keys and transmitter combinations are also possible. A further preferred variant embodiment of the hand-held transmitter provides for the normal key 3 to be moved out linearly instead of rotated about a center of rotation as in the example described. The hand-held transmitter which, with the normal key 3, forms a functional unit according to the invention can also have further remote-control functions for various vehicle systems, such as stationary-vehicle heating or other electrical devices in or on the vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Hand-held transmitter for remote control of vehicle systems, which hand-held transmitter has a housing with electronics and an integrated normal key bit, the normal key bit being connected to the housing and movable between at least first and second positions relative to the housing, and being operable to mechanically actuate a vehicle lock system and a vehicle ignition lock, said hand-held transmitter further having means for emitting a code for remote-controlled actuation of at least the vehicle lock system, wherein:

the hand-held transmitter has a sensor for detecting position of the normal key bit relative to the housing; and the code of the hand-held transmitter for remote-controlled actuation of at least the vehicle lock system is emitted as a function of detected position of the normal key bit relative to the housing or detected movement of the normal key bit relative to the housing, from one of said first and second positions into the other of said first and second positions.

2. Hand-held transmitter according to claim 1, wherein:

the normal key bit of the hand-held transmitter has a first engaged position for activation of a vehicle system, and a second engaged position resting against the housing; and a code which actuates the vehicle lock system is emitted when a position of said normal key bit detected by the sensor no longer corresponds to a preceding position of said normal key.

3. Hand-held transmitter according to claim 1, wherein:

the normal key bit of the hand-held transmitter has a drive position for activation of the vehicle, and a rest position resting against the housing;

a code which unlocks the vehicle lock system is emitted when the sensor detects movement of the normal key bit from said rest position into said drive position; and a code which locks the vehicle lock system is emitted when the sensor detects movement of the normal key from said drive position into said rest position.

4. Hand-held transmitter according to claim 1, wherein the hand-held transmitter has an interrogation device for detecting a state of the lock system.

5. Hand-held transmitter according to claim 4, wherein a warning is issued by the hand-held transmitter when, after emission of a code which locks the vehicle lock system, said interrogation device detects that the vehicle lock system is locked.

6. Hand-held transmitter according to claim 2, wherein the hand-held transmitter has an interrogation device for detecting a state of the lock system.

7. Hand-held transmitter according to claim 6, wherein a warning is issued by the hand-held transmitter when, after emission of a code which locks the lock system, said interrogation device detects the vehicle lock system is locked.

8. Hand-held transmitter according to claim 3, wherein the hand-held transmitter has an interrogation device for detecting a state of the lock system.

9. Hand-held transmitter according to claim 8, wherein a warning is issued by the hand-held transmitter when, after emission of a code which locks the lock system, said interrogation device detects that the vehicle lock system is locked.

10. A hand-held transmitter for remote control of vehicle systems, comprising:

a housing containing electronics, including code emitting means for emitting a code for remote-controlled actuation of at least a vehicle lock system;

a normal key bit which is connected to the housing and is moveable between at least first and second positions relative to the housing, said normal key bit being operable to mechanically actuate said vehicle lock system and a vehicle ignition lock; and a sensor for detecting position of the normal key bit relative to the housing;

the code emitted by said code emitting means for remote control actuation of at least the vehicle lock system being emitted as a function of detected position of the normal key bit relative to the housing or detected movement of the normal key bit relative to the housing, from one of said first and second positions into the other said first and second positions.

* * * * *